United States Patent [19]
Shiiki et al.

[11] Patent Number: 4,651,248
[45] Date of Patent: Mar. 17, 1987

[54] THIN-FILM MAGNETIC HEAD

[75] Inventors: Kazuo Shiiki, Tsukui; Yoshihiro Shiroishi, Hachioji; Isamu Yuito, Ohme; Kiminari Shinagawa, Tsukui; Hideo Fujiwara, Tokorozawa, all of Japan

[73] Assignee: Hitachi, Ltd., Tokyo, Japan

[21] Appl. No.: 500,907

[22] Filed: Jun. 3, 1983

[30] Foreign Application Priority Data

Jun. 4, 1982 [JP] Japan .................. 57-95633

[51] Int. Cl.⁴ .................. G11B 5/23; G11B 5/187; G11B 5/17; G11B 5/147
[52] U.S. Cl. .................. 360/119; 360/122; 360/123; 360/126
[58] Field of Search .............. 360/119, 120, 122, 123, 360/125, 126, 127, 110; 29/603

[56] References Cited

U.S. PATENT DOCUMENTS

| 4,246,620 | 1/1981 | Kaminaka et al. | 360/127 |
| 4,295,173 | 10/1981 | Romankiw et al. | 360/125 |
| 4,318,148 | 3/1982 | Kaminaka et al. | 360/127 |
| 4,539,616 | 9/1985 | Yuito et al. | 360/125 |

FOREIGN PATENT DOCUMENTS

| 57-172519 | 10/1982 | Japan | 360/125 |
| 58-77016 | 5/1983 | Japan | 29/603 |
| 58-80117 | 5/1983 | Japan | 29/603 |

OTHER PUBLICATIONS

Romankiw et al., "Thin Film and Thin-Film/Ferrite Hybrid Magnetic Heads," IBM Tech. Disc. Bull., vol. 18, No. 1, Jun. 1975.
Kanai et al., "High Track Density Thin-Film Tape Heads," IEEE Transactions on Magnetics, vol. MAG-15, No. 3, Jul. 1979.

Primary Examiner—Stuart N. Hecker
Assistant Examiner—Benjamin E. Urcia
Attorney, Agent, or Firm—Antonelli, Terry & Wands

[57] ABSTRACT

A thin-film magnetic head which has a structure wherein a spiral conductor coil having a plurality of turns is disposed between first and second magnetic layers being substantially in parallel with each other, through upper and lower inorganic insulator layers, and in which a part of the outermost turn of the conductor coil is exposed on a face opposite a magnetic recording medium along with the upper and lower inorganic insulator layers, to form a magnetic gap. This head can be readily manufactured by a manufacturing method including the step of forming the outermost turn of the conductor coil on the side of the face opposite the magnetic recording medium so as to be wider than any other part of the conductor coil, and the step of thereafter machining the face opposite the magnetic recording medium so as to expose the outermost turn of the conductor coil on the face opposite the magnetic recording medium. The magnetic head of the present invention is suited to high-density recording, and is high in recording and reproducing efficiencies and also in reliability.

8 Claims, 8 Drawing Figures

THIN-FILM MAGNETIC HEAD

BACKGROUND OF THE INVENTION

The present invention relates to a thin-film magnetic head. More particularly, it relates to an induction type thin-film magnetic head having excellent reproducing and recording efficiencies and suited to high-density magnetic recording and reproduction. Specifically, it relates to a thin-film magnetic head effective for perpendicular magnetic recording.

The perpendicular magnetic recording method records a signal by magnetizing a face of a recording medium, such as magnetic tape and disk, in a vertical direction (thickness direction). It attains a high recording density unlike a conventional method which records a signal by magnetizing the recording medium substantially in a planar direction. As magnetic heads for the perpendicular magnetic recording, various types have hitherto been proposed. They include magnetic head structures for enhancing the recording density and for enhancing the vertical magnetic recording efficiency. However, these heads are generally low in the reproducing efficiency. Therefore, they have had the disadvantages (1) that a high output is difficult to be attained, (2) that in order to attain a high output, the number of turns of a coil needs to be increased, resulting in an increased inductance, and (3) that due to the increased inductance, the resonance frequency of the head lowers, the head being unusable especially in a high frequency region of above seveal MHz.

As an attempt to solve the disadvantages, it is considered to form a magnetic head for perpendicular recording by the use of the photolithographic technology as disclosed in Japanese Laid-open Patent Application No. 56-83826. It has been difficult, however, to realize a magnetic head which has a high recording density and a high reproducing efficiency, which is usable in a high frequency region and which has a satisfactory reliability for use over a long time.

The following references are cited to show the state of the art; (i) Japanese Laid-open Patent Application No. 52-55513, (ii) Japanese Laid-open Patent Application No. 56-83826.

SUMMARY OF THE INVENTION

The present invention has for its object to eliminate the difficulties of the prior arts, and to provide a thin-film magnetic head which has a high recording density as well as a high reproducing efficiency, which is usable even in a high frequency region and which has a satisfactory reliability even in practical use.

In order to accomplish the object, the thin-film magnetic head of the present invention is constructed by including a first magnetic layer which is formed on a nonmagnetic substrate or a magnetic substrate which serves also as a first magnetic layer (hereinbelow, the latter substrate shall also be termed "first magnetic layer"), a lower inorganic insulator layer which is formed on said first magnetic layer, a conductor coil of a plurality of turns which is spirally formed on said lower inorganic insulator layer, an upper insulator layer which is formed on said conductor coil including said lower inorganic insulator layer and which has its recess filled up with an organic insulator layer and has its convex top exposed so as to flatten a surface, and a second magnetic layer which is formed on said upper insulator layer; wherein a part of the outermost turn of said conductor coil is exposed on a face opposite a magnetic recording medium and forms a magnetic gap between said first and second magnetic layers along with said upper and lower inorganic insulator layers, said organic insulator layer is not exposed in the vicinity of, at least, the surface of said magnetic gap confronting the magnetic recording medium, and said second magnetic layer lies in contact with said first magnetic layer in a central part of the spiral of the spiral conductor coil.

The conductor coil is often formed in such a way that the part of the outermost turn of said conductor coil to be exposed on said face of said magnetic head opposite the magnetic recording medium is rendered greater in width than any other part of said conductor coil in advance, and that the width of the outermost turn part is simultaneously reduced at machining for forming said face of said magnetic head opposite the recording medium, so as to become approximately equal to the width of the other part of said conductor coil. However, the width of the outermost turn part may well be greater than that of the other part of said conductor coil.

It is desirable that a thickness of said first magnetic layer is at least 10 times greater than a shortest wavelength to be recorded, and that a thickness of said second magnetic layer is smaller in the vicinity of said face opposite the magnetic recording medium than in any other part thereof and is at most $\frac{1}{2}$ of the shortest wavelength to be recorded.

It is more desirable that said upper inorganic insulator layer is thinner than said lower insulator layer.

In order to attain an abrupt distribution of lines of magnetic induction in the vicinity of the upper magnetic layer by utilizing eddy current, a shielding conductor layer may be disposed outside said second magnetic layer in the vicinity of, at least, said face opposite the magnetic recording medium, directly or through an inorganic insulator layer. A favorable result is obtained particularly when the magnetic head is used in a high frequency region.

As the magnetic substrate, an Mn-Zn ferrite single-crystal substrate can be ordinarily used, and Mn-Zn ferrite poly-crystal, Ni-Zn ferrite, soft magnetic films such as Ni-Fe, Fe-Si, Fe-Al-Si alloys deposited on nonmagnetic substrate can be also used for the magentic substrate, but it is not restrictive.

The second magnetic layer in the vicinity of the face opposite the magnetic recording medium may be made of a material of high magnetic permeability and high saturation flux density, for example, permalloy, amorphous alloys such as Co-W-Zr, Co-Mo-Zr, Co-Ti, Co-Fe-B and Co-Fe-Si-B, and layered films such as Ni-Fe and Fe-Si. The inventors have found out that an Fe—3 to 10 wt.-% Si alloy to which 3 to 4 wt.-% of Cr and/or 0.5 to 1 wt.-% of Ru are/is added has a high saturation flow density and a good resistance to corrosion. While this magnetic material is especially recommended as the material of said second magnetic layer, it is not restrictive.

The conductor coil may be made of a conventional material such as Al. In this regard, however, an alloy which contains Cu and/or Al as a principal constituent and to which at most 6 wt.-% of Cr is added exhibits a good resistance to corrosion. The conductor coil made of this alloy has an enhanced reliability, and affords a more favorable result.

As stated above, the thin-film magnetic head of the present invention has a structure wherein a spiral conductor coil having a plurality of turns is disposed between first and second magnetic layers being substantially in parallel with each other, through upper and lower inorganic insulator layers, and it has a part of the outermost turn of the conductor coil exposed on a face of the magnetic head opposite a magnetic recording medium along with the upper and lower inorganic insulator layers, to form a magnetic gap. Herein, in order to allow a sufficient recording current to flow, the conductor coil must not include an extremely narrow part.

To this end, in fabricating the magnetic head, the width of that part of the outermost turn of the conductor coil which becomes the front end side of the magnetic head (the side close to the face opposite the magnetic recording medium) needs to be set greater than the width of the inner turns. It is accordingly inevitable to manufacture the head of the present invention via the step of forming the width of a conductor which is to be finally exposed on a face opposite a magnetic recording medium, to be greater than the width of the inner part of the conductor in advance, and the step of exposing the conductor and reducing the width thereof to a proper magnitude.

As described above, the present invention especially optimizes the structure and dimensions of a magnetic head to the perpendicular magnetic recording system and also develops new thin-film techniques and selects suitable materials, thereby to provide a thin-film magnetic head which has a high recording density as well as a high reproducing efficiency, which is usable in a high frequency region and which has a satisfactory reliability even in practical use.

Regarding items not especially referred to in this specification, techniques known in the pertinent technical field may be resorted to.

The thin-film magnetic head of the present invention can be readily produced by a manufacturing method comprising (i) the step of providing a lower inorganic insulator layer on a first magnetic layer, (ii) the step of forming on said lower inorganic insulator layer a conductor coil which has a plurality of turns and in which a part of the outermost turn to be exposed on a face opposite a magnetic recording medium is wider than any other part of said conductor coil, (iii) the step of providing an upper inorganic insulator layer on said lower inorganic insulator layer and said conductor coil, (iv) the step of providing on said upper inorganic insulator layer an organic insulator layer so as to reduce ruggedness of said upper inorganic insulator layer, (v) the step of etching a surface of said organic insulator layer flat so as to expose a convex top of said upper inorganic insulator layer, (vi) the step of providing a second magnetic layer on an upper insulator layer which consists of said upper inorganic insulator layer and said organic insulator layer, and (vii) the step of machining a side of the face opposite the magnetic recording medium, to expose the outermost turn part of said conductor coil and to bring it into a predetermined width.

DESCRIPTION OF THE PRESENTLY PREFERRED EMBODIMENTS

The thin-film magnetic head of the present invention will now be described more in detail in regard to embodiments while being compared with a prior-art example.

REFERENCE EXAMPLE

Figure 1:
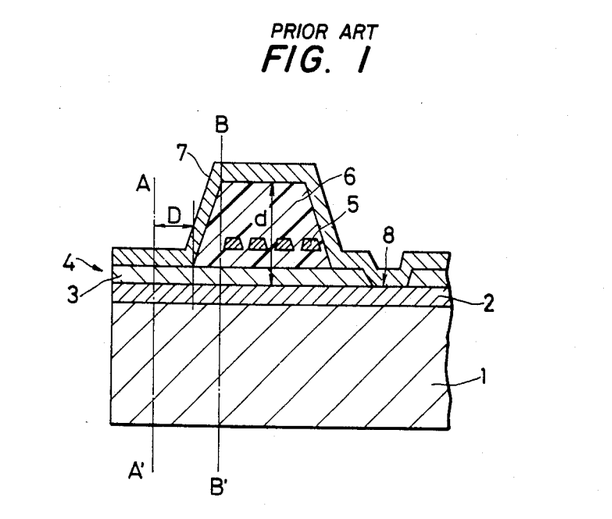
FIG. 1 is a sectional view of a part of a prior-art thin-film magnetic head.

FIG. 1 shows a partial sectional structure of a typical thin-film magnetic head which has been employed for a conventional magnetic recording system (planar recording system).

In FIG. 1, numeral 1 designates a nonmagnetic substrate, numeral 2 a first thin-film magnetic layer, and numeral 3 a nonmagnetic layer for forming a magnetic gap 4. This nonmagnetic layer is usually made of an insulator for the concurrent purpose of insulating the first and second magnetic layers, a wound coil, etc. When an organic type insulator (such as adhesive) is exposed on the face of the magnetic head opposite a recording medium, it often occurs upon the contact between the magnetic head and the magnetic recording medium that the organic insulator is very slightly forced out and covers the magnetic layer appearing at the aforementioned face of the magnetic head, in the form of a thin film, to lower a magnetic head output or to form the cause of head crash. In case of a practical magnetic head, therefore, an inorganic material such as $SiO_2$ and $Al_2O_3$ is used as the insulator for forming the magnetic gap. In addition, since a signal is recorded by the magnetic gap in the planar recording, the magnetic gap needs to be as thin as possible to the end of recording a short wavelength (recording at a high density). A typical thickness at the present day is approximately 1 $\mu$m or less.

Numeral 5 indicates the conductor coil, numeral 6 a filling insulator, and numeral 7 the second thin-film magnetic layer. The conductor coil 5 lies within the protrusion of the second magnetic layer 7 encircling the most proximate portion (the central part of the spiral of the conductor layer) 8 of the second magnetic layer 7 and first magnetic layer 2 where they are contiguous, and it is spirally wound a plurality of turns (four turns in the illustrated example) in the state in which it is buried in the filling insulator 6. The coil is sometimes wound and layered in the form of a helix, but the spiral configuration is more practical because a smaller number of forming steps suffice. In actuality, a protective layer is further provided thereon in some cases as may be needed. The filling insulator 6 serves to fill up the interspaces between the turns of the conductor coil 5 so as to prevent fine rugged parts from arising in the second magnetic layer 7. Since an inorganic type insulator is difficult of effecting such flattening, an organic type insulator such as photoresist and polyimide resin is usually used. In general, it is known that a magnetic film formed on a rugged underlying layer exhibits inferior magnetic characteristics, and the flattening is an important technique required for improving the performance of a thin-film magnetic head.

The spacing d between the second magnetic layer 7 and the first magnetic layer 2 in the rear part of the magnetic head where the conductor coil 5 exists (the deeper part with respect to the front end, in other words, to the face confronting the magnetic recording medium) needs to be great for the purpose of preventing the line of magnetic induction from leaking to the utmost. The spacing is usually set at 3 $\mu$m or above, and is typically set at a value of 5–10 $\mu$m. On the other hand, the magnetic gap is approximately 1 $\mu$m thick as stated before. Thus, the front end of the head is converged toward the face opposite the magnetic recording medium as illustrated in FIG. 1. Such converged structure, however, is liable to magnetic saturation and has led to the serious disadvantage of the prior-art magnetic head construction. The thickness of the first magnetic layer 2 as well as the second magnetic layer 7 needs to be great in order to lower the magnetic reluctance thereof. It is ordinarily set at approximately 1–4 $\mu$m.

The magnetic head element as shown in FIG. 1, having been formed on the substrate by the use of the thin-film technology, is subjected to machining operations such as cutting, grinding and polishing and is finally finished up so that a section A—A' may become the face opposite the magnetic recording medium. The depth D of the magnetic gap at this time is ordinarily set at a value of 2–10 $\mu$m.

EMBODIMENTS

Figure 2:
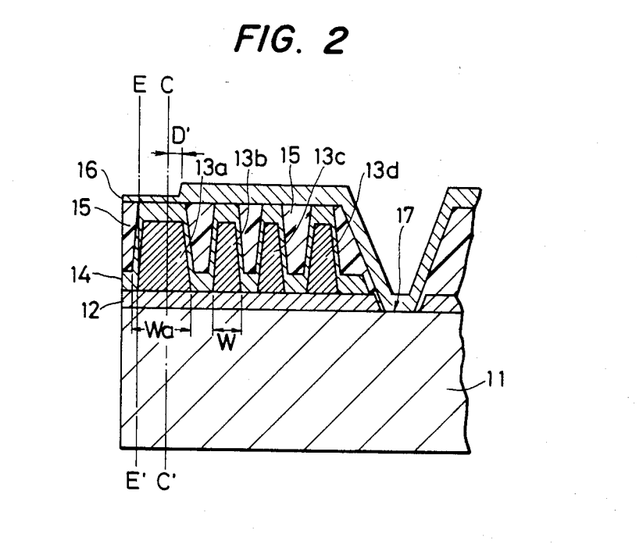
FIG. 2 is a sectional view of a part of a thin-film magnetic head in an embodiment of the present invention.

FIG. 2 shows a partial sectional structure of an example of a thin-film magnetic head for use in the perpendicular magnetic recording system.

In FIG. 2, numeral 11 designates an Mn-Zn ferrite single-crystal substrate, which serves also as the first magnetic layer mentioned before. Here, a mirror-finished substrate 1 mm thick was used. It is also possible to form a magnetic film on a nonmagnetic substrate and use it as the first magnetic layer, as mentioned above. In order to perform good perpendicular recording and reproduction, however, the first magnetic layer should desirably be sufficiently thick or at least 10 times thicker than the shortest wavelength to be recorded, as will be described later. Assuming about 0.5 $\mu$m as a typical value capable of realizing the shortest wavelength, the first magnetic layer must be formed at a thickness of at least 5 $\mu$m. Although this is not impossible, the combined use of the first magnetic layer and the substrate is more desirable in practical use than the formation of such thick film.

Although a sintered material, etc. are included as magnetic substrates, they are inferior to the single crystal in the points of machinability, surface roughness, resistance to wear, etc. In addition, a metallic material is undesirable because its effective thickness decreases due to eddy current when the magnetic head is used at a high frequency. The Mn-Zn ferrite single-crystal plate is the most practical from the viewpoints of magnetic characteristics, machinability, surface roughness, resistance to wear, etc. If necessary, the crystal orientation of the single crystal is properly selected, whereby the performance of the magnetic head can be enhanced still more.

In FIG. 2, numeral 12 designates an inorganic insulator layer which is made of $SiO_2$, $Al_2O_3$ or the like. In the present example, $SiO_2$ was formed to a thickness of about 1 $\mu$m by the sputtering process. However, the thicknes of the layer 12 may be ranged from 0.1 to 10 $\mu$m, preferably from 0.5 to 5 $\mu$m. Symbols 13a–13d denote conductor coil parts. In the present example, an Al layer was deposited to a thickness of about 5 $\mu$m, which may be ranged typically from 1 to 5 $\mu$m, by the evaporation process and was etched by the use of the photolithographic technology, to form a spiral coil of 4 turns around a portion 17 which becomes the most proximate point between the first and second magnetic layers. At this time, the width Wa (15 $\mu$m in the example) of the conductor coil part 13a located on the front end side of the magnetic head to be manufactured (the side of the magnetic head close to the face thereof opposite a magnetic recording medium) is rendered larger than the width W (5 $\mu$m in the example) of each of the conductor coil parts 13b, 13c and 13d located on the side remote from the face opposite the medium. Width Wa may be changed from 2 to 15 $\mu$m, and width W may be changed from 1.5 to 10 $\mu$m. The range of values for the distance between adjacent conductor coil parts is from 1.5 to 10 $\mu$m. When a plane C—C' is formed into the face opposite the medium by later machining, the conductor coil part 13a is exposed to this plane.

Numeral 14 indicates an inorganic insulator layer which is made of $SiO_2$, $Al_2O_3$ or the like. In the present example, an $SiO_2$ layer was formed to a thickness of about 1 $\mu$m by the sputtering process. In general, the thicknes of the upper inorganic insulator layer may be changed from 0.5 to 5 $\mu$m. Since the surface of the $SiO_2$ layer 14 has rugged parts reflecting the ruggedness of the underlying conductor coil 13, any flattening operation is usually required. It is also possible to form a flat surface by the use of a special sputtering process such as the AC biased sputtering method, but this measure is undesirable because of a long time taken.

Figure 3:
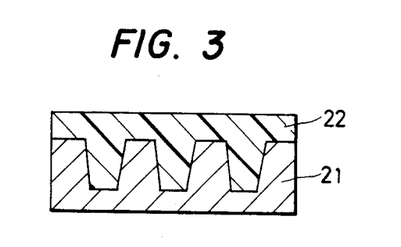
FIGS. 3 and 4 are sectional views for explaining certain steps in a method of manufacturing a thin-film magnetic head according to the present invention.
Figure 4:
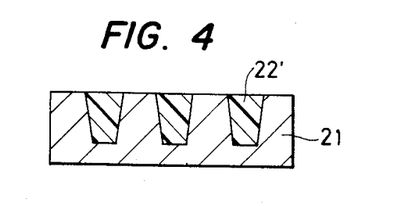

Shown at numeral 15 is an organic insulator such as photoresist and polyimide resin, which is used for flattening the insulator layer 14. Here, "PIQ" (trade name of Hitachi Chemical Co., Ltd. in Japan) which is a polyimide resin was used. The steps of flattening the rugged parts of the $SiO_2$ layer with the PIQ are illustrated in FIGS. 3 and 4. Numeral 21 indicates the rugged $SiO_2$ layer as an underlying layer. This layer is overlaid with a PIQ layer 22 by, e.g., the spin coating method. In general, when the PIQ is applied to a thickness, at least, approximately equal to the step of the rugged part by utilizing the viscousness thereof, the underlying rugged parts can be entirely covered to flatten the surface. Subsequently, as shown in FIG. 4, the PIQ layer 22 is uniformly etched down to the convex tops of the $SiO_2$ layer 21 so as to leave a PIQ layer 22' in only the recesses of the $SiO_2$ layer 21 and to expose the convex tops of the $SiO_2$ layer 21, the surface of which is then flattened. While such steps are also possible by the use of the wet etching process employing an etchant for the PIQ, a sputter etching method employing argon gas was used here. With the sputter etching process, the etching rates of $SiO_2$ and PIQ can be substantially equalized by selecting proper conditions. Therefore, when the $SiO_2$ layer is somewhat overetched, a surface of good flatness is obtained. The etching rate depends on, for example, the gases added to argon gas and the pressures of argon gas and the other added gases such as oxygen. Accordingly one can very easily determine the proper conditions by changing and/or controlling them. In the present embodiment, the pressure of argon gas was $2 \times 10^{-2}$ Torr, the input power was 500 W and the pressure in the etching chamber before the introduction of the pure argon was about $1 \times 10^{-6}$ Torr. In FIGS. 3 and 4, the illustration of the conductor coil is omitted.

Referring back to FIG. 2, numeral 16 denotes a second magnetic layer. Under the state under which, using the method illustrated in FIGS. 3 and 4, the recesses of the $SiO_2$ layer 14 were filled up with the PIQ and the convex tops of the $SiO_2$ layer 14 were exposed, the second magnetic layer 16 was formed by sputtering on the surface of the $SiO_2$ layer 14 flattened owing to the PIQ layer. Thus, the second magnetic layer 16 can be formed flat substantially in parallel with the plane of the ferrite single-crystal substrate 11, and the degradation of magnetic characteristics does not take place due to the fact that the second magnetic layer is converged toward the face A—A' of the magnetic head opposite the magnetic recording medium (the front end of the magnetic head) as in the prior art shown in FIG. 1. Moreover, in the thin-film magnetic head of the present invention, only the second magnetic layer 16, first magnetic layer 11, $SiO_2$ layers 12 and 14 and conductor coil part 13a are exposed on the face C—C' opposite the magnetic recording medium, so that any trouble attributed to the exposure of the organic resin such as PIQ used for flattening the $SiO_2$ layer 14 is not involved.

Figure 8:
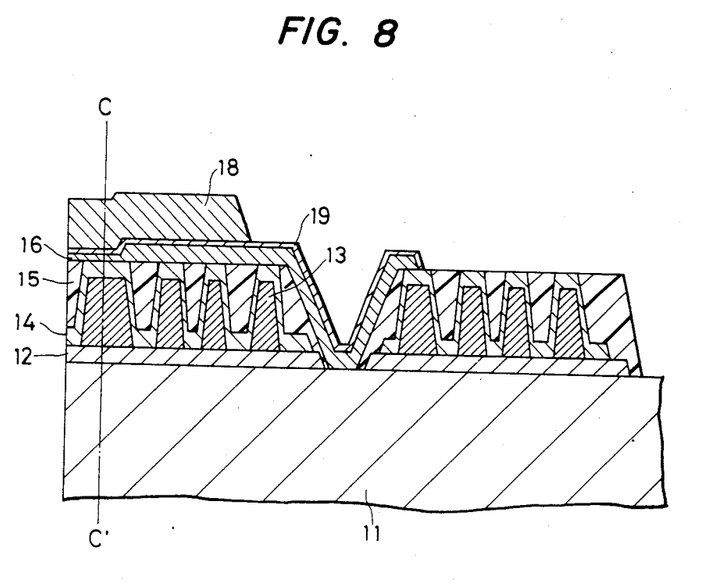
FIG. 8 is a sectional view of a thin-film magnetic head in another embodiment of the present invention.

Further, in order to record short wavelengths (i.e., to attain high-density recording) in the perpendicular magnetic recording, the thickness of the second magnetic layer in the vicinity of the face C—C' of the magnetic head opposite the magnetic recording medium needs to be at most $\frac{1}{2}$ of the shortest wavelength to be recorded and reproduced. Here, the thickness was set at about 0.2 μm with the recording and reproduction of a signal of 0.5 μm in wavelength as an aim. However, when the whole second magnetic layer is rendered so thin, the magnetic reluctance becomes high to worsen the performance of the magnetic head. Therefore, the thickess of the rear part of the second magnetic layer was increased to about 2 μm and it can be taken within the range of from 0.5 to 6 μm. In addition, the material of the front end part of the second magnetic layer and may be permalloy and other magnetic materials mentioned above, but a material having the highest possible saturation flux density Bs is desirable. Therefore, a sputtered film of an Fe-6.5% Si-based alloy whose Bs was 15 kG and whose magnetic permeability at 10 MHz was about 2,000 was used here. Fe—Si (3 to 4% Si) alloys are usually used as the materials of transformers, but they are not used as the magnetic materials for magnetic heads because of their disadvantages of low permeabilities of several tens to several hundred and liability to rust. The inventors selected the aformentioned Fe—Si alloy composition different from the compositions ordinarily used for transformers, added the elements of Cr (3 to 4 wt.-%) and/or Ru (0.5 to 1 wt.-%) or the like to the alloy and optimized the additive elements, whereby the Fe—Si alloy of the front end of the magnetic head was rendered difficult to rust. More preferably, the layers of the alloy and nonmagnetic layers such as $SiO_2$ layers are stacked into a multiple layer (here, four magnetic layers each being 0.05 μm thick and four nonmagnetic layers each being 0.005 μm thick were stacked), thereby to enhance the magnetic permeability. When the multiple layer was applied to the present invention, a still better result was noted. As the second magnetic layer in the rear part of the magnetic head, four layers of permalloy each being 2 μm thick and four layers of the Fe—Si-based alloy each being about 0.2 μm were stacked and used. In this case, the magnetic layers and the nonmagnetic layers are stacked into the multiple layer to the end of preventing the drawback that, when merely the magnetic layer is formed to be thick, a columnar structure normal to the plane of the film develops to degrade magnetic characteristics. Further, in order to establish an abrupt distribution of lines of magnetic induction in the vicinity of the second magnetic layer by utilizing eddy current, it is sometimes more preferable to dispose a shielding conductor layer 18 on the second magnetic layer, at least, in the vicinity of the face C—C' of the magnetic head opposite the magnetic recording medium, as illustrated in FIG. 8. Al, Cu, Al—Cu alloy, Au or the like can be used for the shielding conductor layer. Especially in case of using the magnetic head in a high frequency region, it is more desirable to dispose the shielding conductor layer. It is recommended to set the thickness of the shielding conductor layer at 3 μm-20 μm. In this case, when the second magnetic layer and the shielding conductor layer are in direct contact, a local battery is formed at the step of wet etching or the like and poses a problem in the manufacturing process. In the case of disposing the shielding conductor layer, therefore, it is more desirable to provide a thin insulator layer 19 (about 0.1-0.2 μm thick) made of $SiO_2$, $Al_2O_3$ or the like, between both the layers.

To the end of attaining the abrupt distribution of lines of magnetic induction by utilizing the eddy current, the conductor coil 13 should desirably be as close to the second magnetic layer 16 as possible, and at least, it should favorably be closer to the second magnetic layer 16 than to the first magnetic layer 11. To this end, the upper inorganic insulator layer 14 may be formed thinner than the lower insulator layer 12.

Unlike the prior-art magnetic head, the magnetic head of the present invention thus far described has the conductor coil part 13a exposed in the air. It is therefore desirable to make the conductor coil out of a material of good corrosion resistanace. In particular, Al is sometimes corroded by polishing water or the like during an after-treatment, the care of selecting a fluid, etc. is required so as to avoid such drawback. When, to the end of obviating such difficulty, an alloy whose main constituent is Cu and/or Al and which contains Cr at a content of from 0.5 to 6 wt.-%, preferably about 1 wt.%, is applied to the magnetic head of the present invention, the reliability is enhanced more because the alloy does not exhibit a very high resistivity and has a corrosion resistance. In a case where both Cu and Al form the main constituent, it is especially desirable that the ratio of $$\left(\frac{Cu}{Cu + Al}\right)$$

ranges from 2 to 10 wt.-%.

In the above, in order to clearly elucidate the present invention, the techniques of forming the principal portions only have been described, and the processes for the portions which are not especially different from the techniques of forming the prior-art thin-film magnetic head have been omitted from the description.

The magnetic head element of the present invention formed on the substrate as shown in FIG. 2 is cut at the fore end part, for example, along a plane E—E', is subjected to machining operations such as grinding and polishing, and is finally finished up so that the plane C—C' may become the face confronting the magnetic recording medium. Herein, a length D' corresponding to the depth D of the magnetic gap of the prior-art thin-film magnetic head should desirably be set at a value of 0.5–5 μm. The length D' corresponds to the length of the front end part of the second magnetic layer. With a greater length, the second magnetic layer was magnetically saturated, the performance of the head being unsatisfactory. With a smaller length, a satisfactory lifetime of the magnetic head was not attained due to wear etc.

According to the method of manufacturing a thin-film magnetic head explained in the example, it is possible to readily produce the thin-film magnetic head of the present invention having excellent characteristics in which the organic insulator used for the insulation of the conductor coil is not exposed on the face confronting a magnetic recording medium, the second magnetic layer is flat, the first magnetic layer and second magnetic layer are sufficiently distant, and the conductor coil is wound a plurality of turns. On the other hand, when the prior-art thin-film magnetic head shown in FIG. 1 is so machined that the vicinity of a plane B—B' forms the face confronting the magnetic recording medium, a thin-film magnetic head having a similar structure is produced, but this magnetic head is not practical because the organic insulator comes out on the face confronting the magnetic recording medium.

FIG. 8 is a sectional view showing an embodiment of the thin-film magnetic head of the present invention wherein the shielding conductor layer is provided outside the second magnetic layer. As referred to before, numeral 18 indicates the shielding conductor layer, and numeral 19 the inorganic insulator layer. When these layers 18 and 19 are removed from FIG. 8, the resultant structure becomes the foregoing thin-film magnetic head of the present invention which is not shielded. In FIG. 8, a pad for connecting the coil and an external lead is not shown.

The thin-film magnetic head of the present invention for the perpendicular magnetic recording as set forth above has been realized for the first time by a manufacturing method which includes:

(1) the step of forming a spiral conductor coil of a plurality of turns on a first magnetic layer through an inorganic insulator film, with a width of at least a part of the outermost turn of the conductor coil being rendered greater than widths of the other turns of the coil so that the outermost turn may be partly exposed on a face opposite a magnetic recording medium to be formed by later machining;

(2) the step of providing a layer of an organic insulator such as PIQ on a layer of an inorganic insulator such as SiO$_2$ deposited on the conductor coil including the inorganic insulator film, the organic insulator layer having a flat surface; and (3) the step of etching the organic insulator layer of the flat surface until a convex top of the inorganic insulator layer is exposed.

The characteristics of the thin-film magnetic head of the present invention and the thin-film magnetic head of the prior art described above were compared, and the results will be stated hereunder.

(1) The prior-art thin-film magnetic head having the structure shown in FIG. 1 was so machined that the plane B—B' formed the face confronting a magnetic recording medium, and an experiment was conducted in which it was caused to float on the rotary disk. Then, it underwent head crash and damaged the disk in several test cycles. When the magnetic head element of the present invention shown in FIG. 2 was so machined that the plane C—C' formed the face confronting the magnetic recording medium, no abnormality was noted in a similar experiment, and the effect was remarkable that the organic insulator was not exposed on the face opposite the magnetic recording medium.

Figure 5:
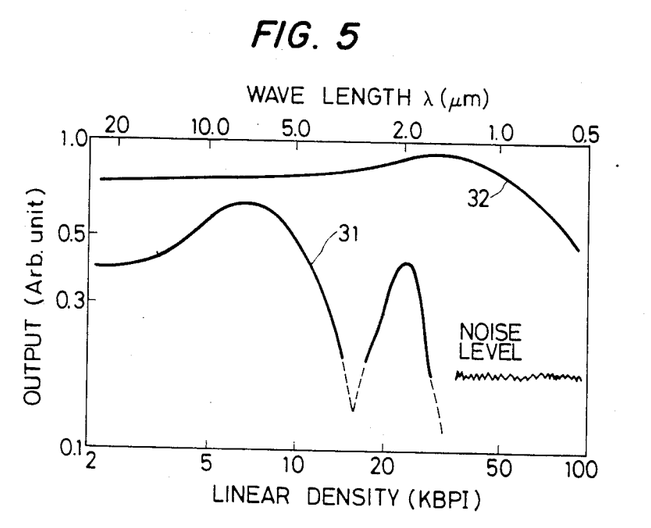
FIG. 5 is a graph showing the relationships between the linear density and the self read/write output, of a magnetic head in an embodiment of the present invention and a thin-film magnetic head in a prior art.

(2) A magnetic disk for perpendicular recording, which had a double-layer medium with a well-known Co—Cr alloy layer formed on a permalloy film, was rotated at a relative speed of 2.5 m/s, and self read-/write characteristics were investigated. Results obtained on the relationships of the magnetic heads between the linear density and the output are shown in FIG. 5. The characteristic (curve 31) of the prior-art thin-film magnetic head (whose face opposite the magnetic recording medium was the plane A—A' in FIG. 1) exhibits some peaks, and is improper for high-density recording. In contrast, the characteristic (curve 32) of the thin-film magnetic head of the present invention (whose face opposite the magnetic recording medium was the plane C—C' in FIG. 2) exhibits no surplus peak, and lies above the noise level of a measuring instrument even at densities higher than 100 KBPI.

(3) Regarding the thin-film magnetic head element of the present invention in FIG. 2, the steps of flattening the inorganic insulator layer explained with reference to FIGS. 3 and 4 were omitted, the second magnetic layer 16 was formed directly on the SiO$_2$ layer 14 having a ruggedness of about 5 μm, and the plane C—C' was used as the face opposite the magnetic recording medium. A thin-film magnetic head thus manufactured provided an output equal to only at most ¼ of that of the thin-film magnetic head of the present invention (whose face opposite the magnetic recording medium was the plane C—C' in FIG. 2). Such bad influence of the undulation of the second magnetic layer relates also to the material and composition of the second magnetic layer. In order to relieve the influence of the undulation attributed to the ruggedness of the second magnetic layer to the extent that the practical use was permitted, it was at least required to render the undulation smaller than the maximum thickness of the second magnetic layer. Similarly, regarding the prior-art thin-film magnetic head shown in FIG. 1, the magnetic gap 4 was formed as thick as 5 μm, and the plane A—A' was used as the face opposite the magnetic recording medium, so that the side of the face opposite the magnetic recording medium as formed the front end of the magnetic head was converged. When the output of the thin-film magnetic head thus manufactured was compared with that of the thin-film magnetic head of the present invention whose front end was completely flattened without being converged, the former was found to be below 60% of the latter, and the thin-film magnetic head of the present invention was verified to be excellent.

Figure 6:
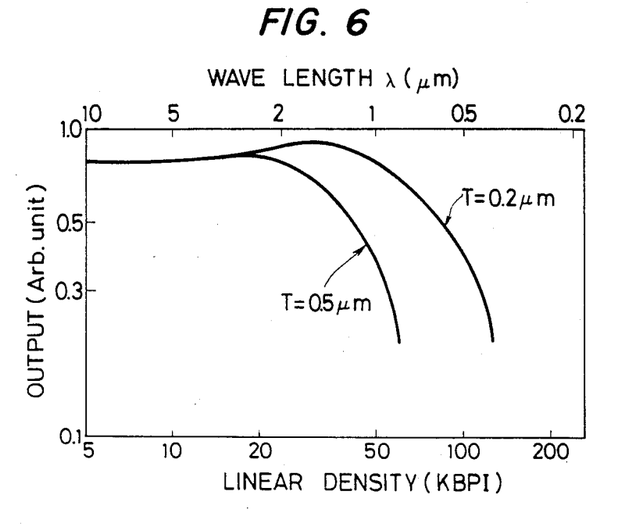
FIG. 6 is a graph showing the relationship between the self read/write output and the linear density in the case where, in a thin-film magnetic head in an embodiment of the present invention, the thickness of a second magnetic layer at a face confronting a magnetic recording medium was varied as a parameter.

(4) Shown in FIG. 6 are the relationships between the self read/write output, and the linear density and the wavelength λ at the time at which, in the thin-film magnetic head of the present invention (whose face opposite the magnetic recording medium was the plane C—C' in FIG. 2), the thickness T of the second magnetic layer 16 at the face opposite the magnetic recording medium was varied. When a recording density at which an output equal to about half of an output at low recording densities is provided is aimed at the highest recording density which is practicable, it is understood that the corresponding wavelength $\lambda_{min}$ to be recorded needs to be set at $T \leq \frac{1}{2}\lambda_{min}$.

Figure 7:
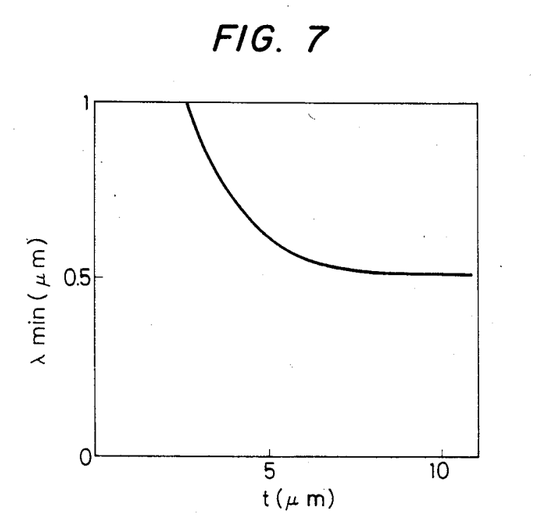
FIG. 7 is a graph showing the relationship between the thickness of a first magnetic layer and the practically recordable shortest wavelength, of a thin-film magnetic head in another embodiment of the present invention.

(5) In FIG. 2, the Mn—Zn single-crystal substrate 11 was replaced with a substrate of "Photoceram" (trade name of a photosensitive glass produced by Corning Inc. in U.S.) on which a permalloy film having each of different thicknesses t was formed. In addition, the thickness T of the second magnetic layer 16 in the vicinity of the face opposite the magnetic recording medium was set at 0.2 μm. As to the samples of the thin-film magnetic head thus prepared, there was investigated the recording wavelength $\lambda_{min}$ corresponding to the recording density at which the self read/write output became half of a value at low recording densities. The result is shown in FIG. 7. It is understood that, in order to attain satisfactory recording and reproduction, the shortest wavelength to be recorded $\lambda_{min}$ needs to be held at $t > 10\lambda_{min}$.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head including a first magnetic layer which is formed on a nonmagnetic substrate or a magnetic substrate which serves also as a first layer (hereinbelow, the latter substrate shall also be termed "first magnetic layer"), a lower inorganic insulator layer which is formed on said first magnetic layer, a conductor coil of a plurality of turns which is spirally formed on said lower inorganic insulator layer, an upper inorganic insulator layer which is formed on said conductor coil including said lower inorganic insulator layer, said upper inorganic insulator layer having a recess in the upper surface thereof and a convex top, an organic insulator layer which fills the recess of said upper inorganic insulator layer so that said upper inorganic insulator layer and said organic insulator layer together form a combined layer having a flat top surface, the flat top surface including the upper surface of the convex top of the upper inorganic insulator layer, and a second magnetic layer which is formed on said flat top surface of said combined layer; wherein a part of the outermost turn of said conductor coil is exposed on a face confronting a magnetic recording medium and forms a magnetic gap between said first and second magnetic layers along with said upper and lower inorganic insulator layers, said organic insulator layer is not exposed in the vicinity of, at least, the surface of said magnetic gap confronting the magnetic recording medium, and said second magnetic layer lies in contact with said first magnetic layer in a central part of the spiral of the spiral conductor coil.

2. A thin-film magnetic head as defined in claim 1, wherein said conductor coil is a coil of a plurality of turns, constructed by steps including initially forming the outermost turn of said conductor coil, which is to be exposed on said face of said magnetic head confronting the magnetic recording medium, to have a greater width, in the plane of the coil, than the other turns of said conductor coil, and then reducing the width of the outermost turn of said conductor coil at machining for forming said face of said magnetic head confronting the recording medium, said reducing the width being such that the outermost turn is reduced to at least approximately equal the width of the other turns of said conductor coil.

3. A thin-film magnetic head as defined in claim 1, wherein a thickness of said first magnetic layer is at least 10 times greater than a shortest wavelength to be recorded, and a thickness of said second magnetic layer is smaller in the vicinity of said face confronting the magnetic recording medium than in any other part thereof and is at most ½ of the shortest wavelength to be recorded.

4. A thin-film magnetic head as defined in claim 1, wherein said upper inorganic insulator layer is thinner than said lower insulator layer.

5. A thin-film magnetic head as defined in claim 1, wherein a shielding conductor layer is disposed outside said second magnetic layer in the vicinity of, at least, said face confronting the magnetic recording medium, directly or through an inorganic insulator layer.

6. A thin-film magnetic head as defined in claim 1, wherein said magnetic substrate is an Mn—Zn ferrite single-crystal substrate.

7. A thin-film magnetic head as defined in claim 1, wherein said second magnetic layer in the vicinity of, at least, said face confronting the magnetic recording medium is made of an alloy containing Fe and Si as a principal constituent.

8. A thin-film magnetic head as defined in claim 1, wherein said conductor coil is made of an alloy which contains, at least, Cu and Cr; Al and Cr; or Cu, Al and Cr.

* * * * *